US012683054B2

(12) United States Patent
Amano et al.

(10) Patent No.: US 12,683,054 B2
(45) Date of Patent: Jul. 14, 2026

(54) NANOGRANULAR MAGNETIC FILM AND ELECTRONIC COMPONENT

(71) Applicant: TDK CORPORATION, Tokyo (JP)

(72) Inventors: Hajime Amano, Tokyo (JP); Kensuke Ara, Toyko (JP); Kazuhiro Yoshidome, Tokyo (JP); Risako Tsurumaru, Tokyo (JP)

(73) Assignee: TDK CORPORATION, Tokyo (JP)

( * ) Notice: Subject to any disclaimer, the term of this patent is extended or adjusted under 35 U.S.C. 154(b) by 462 days.

(21) Appl. No.: 18/159,313

(22) Filed: Jan. 25, 2023

(65) Prior Publication Data

US 2023/0245810 A1 Aug. 3, 2023

(30) Foreign Application Priority Data

Jan. 28, 2022 (JP) ................................ 2022-011795

(51) Int. Cl.
*H01F 10/13* (2006.01)
*C22C 45/02* (2006.01)

(52) U.S. Cl.
CPC .......... *H01F 10/131* (2013.01); *C22C 45/02* (2013.01)

(58) Field of Classification Search
None
See application file for complete search history.

(56) References Cited

U.S. PATENT DOCUMENTS

| | | | | |
|---|---|---|---|---|
| 4,623,408 | A | 11/1986 | Karamon et al. | |
| 6,506,486 | B1 | 1/2003 | Araki et al. | |
| 2022/0305243 | A1 * | 9/2022 | Park | A61M 37/00 |
| 2023/0386720 | A1 * | 11/2023 | Amano | H01F 10/132 |

FOREIGN PATENT DOCUMENTS

| | | | |
|---|---|---|---|
| IE | S2004/0809 | A2 * | 5/2007 |
| JP | S60-152651 | A | 8/1985 |
| JP | 2000-306228 | A | 11/2000 |
| JP | 2001-076333 | A | 3/2001 |
| JP | 3956061 | B2 | 8/2007 |
| JP | 2020-065160 | A | 4/2020 |

* cited by examiner

*Primary Examiner* — Keith D. Hendricks
(74) *Attorney, Agent, or Firm* — Oliff PLC

(57) ABSTRACT

A nanogranular magnetic film includes a structure including first phases comprised of nano-domains dispersed in a second phase. The first phases include at least one selected from the group consisting of Fe, Co, and Ni. The second phase includes at least one selected from the group consisting of O, N, and F. A ratio of a volume of the first phases to a total volume of the first phases and the second phase is 65% or less. The nanogranular magnetic film has a porosity of 0.17 or more and 0.30 or less.

5 Claims, 2 Drawing Sheets

NANOGRANULAR MAGNETIC FILM AND ELECTRONIC COMPONENT

TECHNICAL FIELD

The present invention relates to a nanogranular magnetic film and an electronic component.

BACKGROUND

Recent mobile devices, such as smartphones and smartwatches, have been required to have a larger display, a larger battery capacity, a smaller size, and less weight at the same time. The requirements of having a larger display and a larger battery capacity are inconsistent with the requirements of having a smaller size and less weight. To achieve these inconsistent requirements, circuit boards have been required to have a smaller size. In particular, power supply circuits, which occupy large areas in the circuit boards, have been required to have a smaller size. Accordingly, inductors included in the power supply circuits are required to have a smaller size.

One way to reduce the size of the inductors is to enable the power supply circuits to be used at higher frequencies. To enable the power supply circuits to be used at higher frequencies, switching elements included in the power supply circuits are required to be operable at high frequencies.

In recent years, semiconductors such as GaN and SiC described in Patent Document 1 have been practically used as semiconductors included in the switching elements. For example, as described in Patent Document 2, semiconductors other than silicon have been included in the switching elements.

Including the semiconductors (e.g., GaN) having excellent high-frequency properties in the switching elements enables the switching elements to operate at high frequencies. As the switching elements have become operable at high frequencies, it has become possible to increase the operating frequency of the power supply circuits, meaning that the power supply circuits have become usable at higher frequencies.

As the power supply circuits have become usable at higher frequencies, small inductors that can operate at high frequencies and reduce the size of the power supply circuits have been in demand.

To achieve such a small inductor operable at high frequencies, use of a thin film inductor as the small inductor is effective. The thin film inductor is manufactured by laminating a coil, a terminal, a magnetic film, and an insulating layer or the like on a substrate through semiconductor manufacturing processes. In the thin film inductor, the magnetic film is the magnetic core of the thin film inductor. Thus, it is essential that the magnetic film of the thin film inductor have the requisite properties to enable the thin film inductor to have these properties.

Patent Document 3 discloses a nanogranular magnetic film having a structure including nano-sized crystals dispersed in an insulating matrix. The nano-sized crystals include mainly a metal simple substance, an alloy, or a compound. Examples of the metal simple substance include a simple substance of Fe, a simple substance of Co, and a simple substance of Ni. Examples of the alloy include an alloy containing at least one selected from the group consisting of Fe, Co, and Ni. Examples of the compound include a compound containing at least one selected from the group consisting of Fe, Co, and Ni.

Nanogranular magnetic films have a higher saturation magnetic flux density (Bs) than ferrite materials. The nanogranular magnetic films further have a higher specific resistance (ρ) than normal metal materials. For having a high saturation magnetic flux density (Bs) and a high specific resistance (ρ), the nanogranular magnetic films have a high permeability even at high frequencies. Because the nanogranular magnetic films have a high permeability, application of the nanogranular magnetic films to high-frequency thin film components (e.g., thin film inductors) has been under consideration.

Unfortunately, the thin film inductors with the nanogranular magnetic films are now required to have less losses when operating at high frequencies. The larger the coercivity (Hc) of the nanogranular magnetic films, the larger the hysteresis loss. The smaller the specific resistance (ρ) of the nanogranular magnetic films, the larger the eddy current loss. Thus, nanogranular magnetic films with a good coercivity (Hc) and a further improved specific resistance (ρ) are in demand.

Patent Document 1: JP Patent Application Laid Open No. S60-152651
Patent Document 2: JP Patent Application Laid Open No. 2020-065160
Patent Document 3: JP Patent No. 3956061

SUMMARY

It is an object of the present invention to provide a nanogranular magnetic film having a good coercivity (Hc) and a high specific resistance (ρ).

To achieve the above object, a nanogranular magnetic film according to the present invention comprises a structure including first phases comprised of nano-domains dispersed in a second phase, wherein

- the first phases include at least one selected from the group consisting of Fe, Co, and Ni;
- the second phase includes at least one selected from the group consisting of O, N, and F;
- a ratio of a volume of the first phases to a total volume of the first phases and the second phase is 65% or less; and
- the nanogranular magnetic film has a porosity of 0.17 or more and 0.30 or less.

In the nanogranular magnetic film according to the present invention, the first phases comprised of the nano-domains may have an average size of 30 nm or less.

In the nanogranular magnetic film according to the present invention, a total of Fe, Co, and Ni may occupy 75 at % or more in the first phases.

An electronic component according to the present invention includes the above-mentioned nanogranular magnetic film.

BRIEF DESCRIPTION OF THE DRAWING(S)

DETAILED DESCRIPTION

Hereinafter, an embodiment of the present invention will be explained with reference to the drawings.

Figure 1:
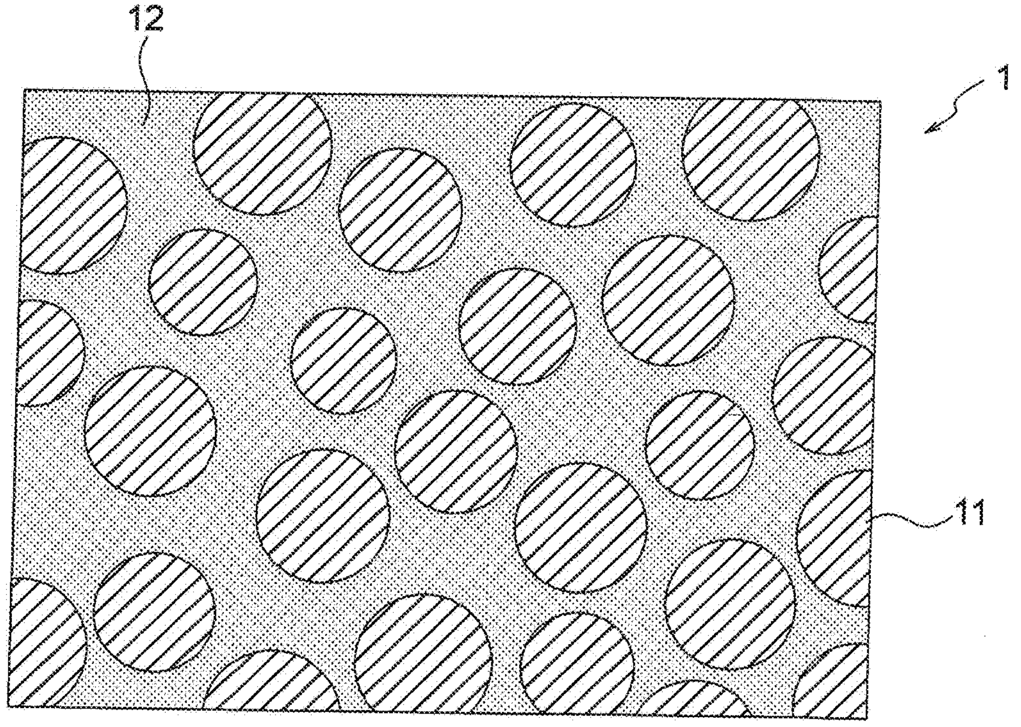
FIG. 1 is a schematic cross-sectional view of a nanogranular magnetic film.
Figure 2:
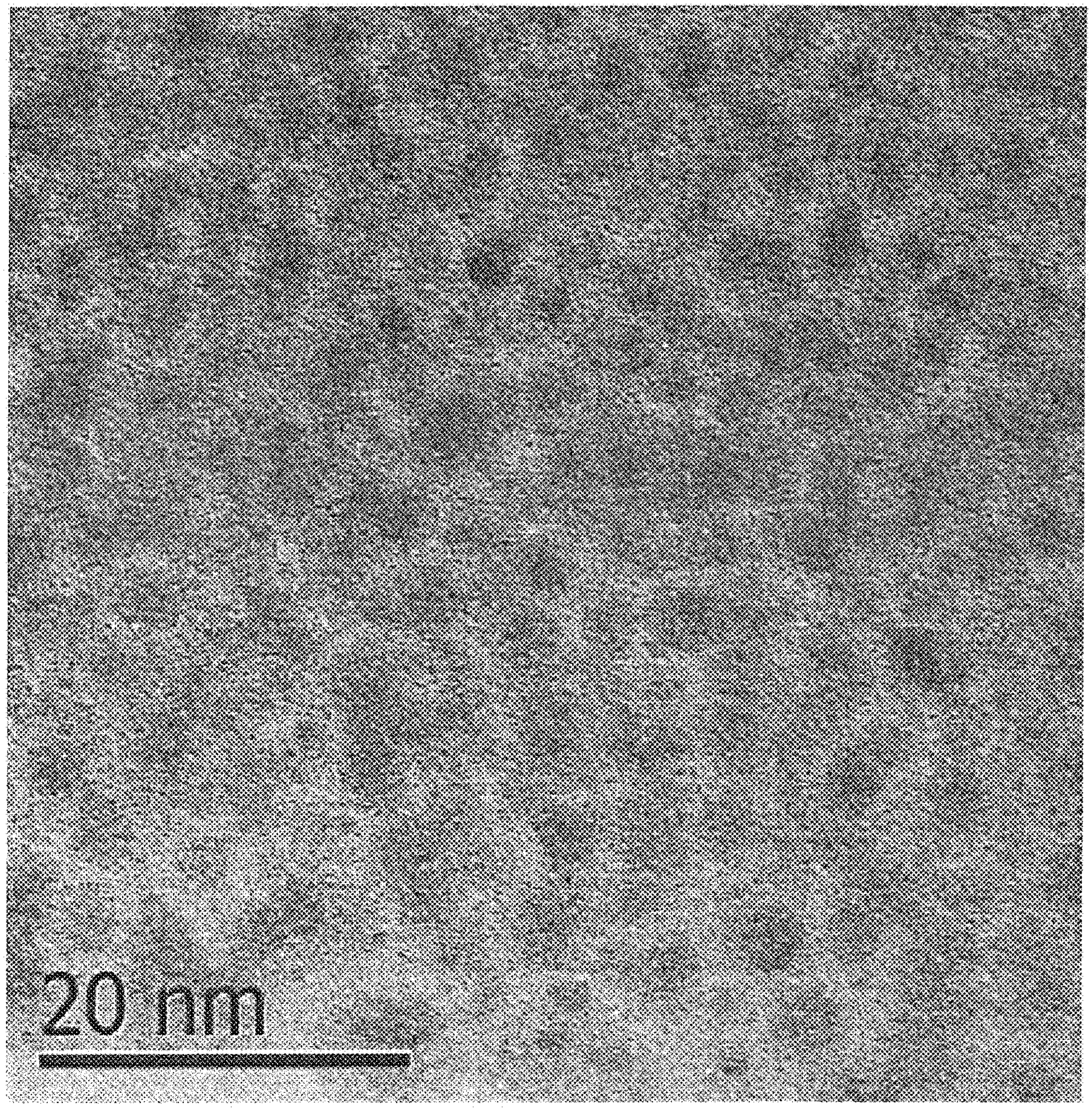
FIG. 2 is a TEM image of Example 5.

As shown in FIG. 1, a nanogranular magnetic film 1 according to the present embodiment has a nanogranular structure. In the nanogranular structure, first phases 11 (nano-domains) are dispersed in a second phase 12. By observing a cross section of the nanogranular magnetic film 1 using a TEM, a TEM image like the one shown in FIG. 2 can be acquired. The TEM image shown in FIG. 2 is a TEM image (magnification: 2,500,000×) of Example 5 described later.

The first phases 11 (nano-domains) have a nanoscale average size, namely an average size of 50 nm or less. The average size of the first phases 11 (nano-domains) may be 30 nm or less. The size of the respective first phases 11 (nano-domains) may be measured by any method. For example, the equivalent circular diameter of each first phase 11 (nano-domain) in a cross section of the nanogranular magnetic film 1 may be regarded as the size of the first phase 11 (nano-domain).

Note that the equivalent circular diameter of the first phase 11 (nano-domain) in the cross section of the nanogranular magnetic film 1 means the diameter of a circle having the same area as the area of the first phase 11 (nano-domain) in the cross section of the nanogranular magnetic film 1.

The first phases 11 may be composed of a pure substance or may be composed of a mixture.

The first phases 11 are phases including a metal element. Specifically, the first phases 11 include at least one selected from the group consisting of Fe, Co, and Ni. The at least one element selected from the group consisting of Fe, Co, and Ni may be included in the first phases 11 in any way. For example, the at least one element selected from the group consisting of Fe, Co, and Ni may be included in the first phases 11 as a simple substance, as an alloy of the at least one element and another metal element, or as a compound of the at least one element and another element. The compound in the first phases 11 may be an oxide magnetic material, such as a ferrite.

The total amount of Fe, Co, and/or Ni in the first phases 11 is not limited to particular values. The ratio of the total amount of Fe, Co, and Ni in the first phases 11 to the total amount of Fe, Co, Ni, X1, and X2 in the first phases 11 may be 75 at % or more and may be 80 at % or more.

- X1 is a metalloid element. For example, X1 may be at least one metalloid element selected from the group consisting of B, Si, P, C, and Ge.
- X2 is a metal element other than Fe, Co, and Ni. For example, X2 may be at least one metal element selected from the group consisting of Cr, Ti, Zr, Hf, V, Nb, Ta, Mo, W, Mn, Cu, Ag, Zn, Al, Sn, Bi, Y, La, and Mg, or at least one metal element selected from the group consisting of Cr, V, Mo, Zr, Nb, Ti, Mn, Zn, Al, Cu, and Y.

The first phases 11 may include elements other than Fe, Co, Ni, X1, and X2. The ratio of the total amount of the elements other than Fe, Co, Ni, X1, and X2 in the first phases 11 to the total amount of Fe, Co, Ni, X1, and X2 in the first phases 11 may be 5 at % or less.

The second phase 12 may be composed of a pure substance or may be composed of a mixture.

The second phase 12 is a phase including a non-metal element. Specifically, the second phase 12 includes at least one selected from the group consisting of O, N, and F. The at least one element selected from the group consisting of O, N, and F may be included in the second phase 12 in any way. For example, the at least one element selected from the group consisting of O, N, and F may be included in the second phase 12 as a compound of the at least one element and another element.

The compound in the second phase 12 may be any compound. For example, the compound may be $SiO_2$, $Al_2O_3$, AlN, ZnO, $MgF_2$, $SnO_2$, $GaO_2$, $GeO_2$, $Si_3N_4 \cdot Al_2O_3$, and BN. The compound may be at least one selected from $SiO_2$, $Al_2O_3$, AlN, ZnO, $MgF_2$, $SnO_2$, $GaO_2$, $GeO_2$, and $Si_3N_4 \cdot Al_2O_3$.

The ratio of the volume of the first phases 11 to the total volume of the first phases 11 and the second phase 12 is 65% or less. In other words, provided that $V_1$ denotes the proportion of the volume of the first phases 11 and $V_2$ denotes the proportion of the volume of the second phase 12, $V_1/(V_1+V_2)$ has a value of 0.65 or less. The value of $V_1/(V_1+V_2)$ may be 0.60 or less. An excessively large ratio of the volume of the first phases 11 to the total volume of the first phases 11 and the second phase 12 reduces the specific resistance (ρ) of the nanogranular magnetic film, because the first phases 11 are more conductive than the second phase 12.

There is no lower limit of the ratio of the volume of the first phases 11 to the total volume of the first phases 11 and the second phase 12. The lower limit may be 30% or more. In other words, the value of $V_1/(V_1+V_2)$ may be 0.30 or more. The value of $V_1/(V_1+V_2)$ may be 0.40 or more. The smaller the ratio of the volume of the first phases 11 to the total volume of the first phases 11 and the second phase 12, the higher the specific resistance (ρ), and unfortunately the lower the saturation magnetic flux density.

The ratio of the volume of the first phases 11 to the total volume of the first phases 11 and the second phase 12 may be measured by any method. For example, the ratio can be calculated from the results of measurement of the nanogranular magnetic film 1 using XRF. The ratio may also be calculated from the ratio of the area of the first phases 11 to the total area of the first phases 11 and the second phase 12 through observation of a cross section of the nanogranular magnetic film 1 using a TEM. In this case, the ratio in terms of area is converted to the ratio in terms of volume.

The nanogranular magnetic film 1 may include only the first phases 11 and the second phase 12. The nanogranular magnetic film 1 may further include different phases other than the first phases 11 and the second phase 12. The different phases may occupy any proportion. The different phases may partly or entirely be a void.

The nanogranular magnetic film 1 according to the present embodiment has a porosity of 0.17 or more and 0.30 or less. Including voids within this range, especially at a porosity of 0.17 or more, enables the nanogranular magnetic film 1 to have a particularly increased specific resistance (ρ) without its composition being substantially changed. Note that the coercivity (Hc) becomes too high at a porosity of over 0.30.

A method of calculating the porosity will be explained below.

First, the percentages of all substances included in the nanogranular magnetic film 1 are measured in terms of weight. The percentages may be measured by any method. For example, the percentages may be measured using XRF.

Next, the percentage of each substance is divided by the density of the substance to convert the percentage in terms of weight to the percentage in terms of volume. Then, the total of the percentages of all substances in terms of volume is calculated.

Next, the total of the percentages of all substances in terms of weight is divided by the total of the percentages of all substances in terms of volume to calculate the theoretical density of the nanogranular magnetic film 1.

Next, a converted thickness of the nanogranular magnetic film 1 is calculated using the deposited amount (weight per unit area) and the theoretical density of the nanogranular magnetic film 1.

Next, the actual thickness of the nanogranular magnetic film 1 is measured. The actual thickness of the nanogranular magnetic film 1 may be measured by any method. For example, the actual thickness can be measured with a TEM, a SEM, or a surface profiler. Also, the reliability of measurement results may be checked by correlating multiple measurement apparatuses with each other in advance.

The value of (1−(converted thickness/actual thickness)) is the porosity. Hereinafter, the simple "thickness" of the film refers to the actual thickness of the film.

The nanogranular magnetic film 1 may have any thickness. For example, the thickness may be 0.05 μm or more and 200 μm or less. A suitable thickness may be appropriately determined based on usage.

Hereinafter, a method of manufacturing the nanogranular magnetic film 1 (soft magnetic thin film) according to the present embodiment will be explained.

The soft magnetic thin film according to the present embodiment may be manufactured by any method, such as sputtering.

First, a substrate on which to form the nanogranular magnetic film is prepared. The substrate may be any substrate. For example, the substrate may be a silicon substrate, a silicon substrate having a thermal oxide film, a ferrite substrate, a non-magnetic ferrite substrate, a sapphire substrate, a glass substrate, a glass epoxy substrate, or the like. However, the substrate is not limited to these substrates. Any of various ceramic substrates or semiconductor substrates can be used. When it is difficult to check various properties using only the thin film to be formed on the substrate (sample substrate), a dummy substrate may also be used as necessary. The thin film may be formed on the sample substrate and the dummy substrate simultaneously, and the properties of the thin film on the dummy substrate may be regarded as the properties of the thin film on the sample substrate.

Next, a sputtering apparatus is prepared. The sputtering apparatus is capable of multi-target simultaneous sputtering. The sputtering apparatus is further capable of changing the distance between sputtering targets and the substrate per sputtering target.

Next, a metal sputtering target and a ceramic sputtering target are prepared as the sputtering targets. The metal sputtering target is a sputtering target mainly including Fe, Co, and/or Ni. The ceramic sputtering target is a sputtering target mainly including the compound in the second phase 12. The composition of the metal sputtering target and the composition of the ceramic sputtering target are appropriately adjusted so that the nanogranular magnetic film has a desired compositional ratio.

Next, the metal sputtering target and the ceramic sputtering target are attached to a sputter gun for metal and a sputter gun for ceramics of the sputtering apparatus respectively. Then, the nanogranular magnetic film is formed on the substrate by multi-target simultaneous sputtering.

Controlling the voltage applied to each sputtering target can control the film deposition speed and the ratio of the volume of the first phases to the total volume of the first phases and the second phase. The film deposition speed can be, for example, 1 Å/s or more and 100 Å/s or less.

Controlling the film deposition speed and the film deposition time can control the thickness of the nanogranular magnetic film.

The present inventors have found that controlling the gas pressure during sputtering and/or the distance between the sputtering targets and the sample substrate can control the porosity of the nanogranular magnetic film. Note that the gas is not limited to particular gases. Examples of the gas include noble gases, particularly Ar.

Specifically, increasing the gas pressure during sputtering can increase the porosity of the nanogranular magnetic film. Also, increasing the distance between the sputtering targets and the sample substrate can increase the porosity of the nanogranular magnetic film.

Now, a mechanism by which the porosity of the nanogranular magnetic film changes will be explained. Note that the gas used in the following explanation is a noble gas.

In sputtering, the sputtering targets have negative charge. The noble gas atoms between the sputtering targets and the substrate are ionized to produce noble gas positive ions and electrons. The noble gas positive ions undergo elastic collision with the sputtering targets having negative charge. At this time, the noble gas positive ions receive electrons from the sputtering targets to become noble gas atoms. In response to the kinetic energy of the noble gas positive ions at the time of elastic collision with the sputtering targets, sputtering particles are sputtered out of the sputtering targets. These sputtering particles are deposited on the substrate to form a sputtering film.

The sputtering particles sputtered out of the sputtering targets may undergo elastic collision with the noble gas atoms in the film formation chamber while moving from the surfaces of the sputtering targets to the substrate. The sputtering particles lose their kinetic energy as they undergo elastic collision with the noble gas atoms. The higher the energy, particularly the kinetic energy, of the sputtering particles at the time of reaching the substrate, the denser the sputtering film. Conversely, the lower the energy, particularly the kinetic energy, of the sputtering particles at the time of reaching the substrate, the less dense the sputtering film.

Also, the shorter the distance between the sputtering targets and the substrate, the higher the kinetic energy of the sputtering particles when they reach the substrate. Consequently, the shorter the distance between the sputtering targets and the substrate, the lower the porosity of the nanogranular magnetic film.

Also, especially when the distance between the ceramic sputtering target and the substrate is long, the porosity of the nanogranular magnetic film is likely to be high. In contrast, changing the distance between the metal sputtering target and the substrate is not likely to change the porosity. Consequently, bringing only the ceramic sputtering target farther from the substrate can increase the porosity of the nanogranular magnetic film to control the porosity at 0.17 or more and 0.30 or less.

The distance between the ceramic sputtering target and the substrate may be changed by any method. The distance is changed by a method appropriate for the sputtering apparatus. Typically, the sputter gun for ceramics is moved to change the distance between the ceramic sputtering target and the substrate.

When only moving the sputter gun for ceramics cannot increase the distance between the ceramic sputtering target and the substrate to an intended distance, for example, the loading position of the substrate may be moved farther from the sputter gun for ceramics than a specified value. In this case, the sputter gun for metal is moved as necessary to change the distance between the sputter gun for metal and the substrate as well.

Conversely, when only moving the sputter gun for ceramics cannot reduce the distance between the ceramic sputtering target and the substrate to an intended distance, for example, the substrate holder where the substrate is attached may be moved closer to the sputter gun for ceramics than a specified value. Also, a jig or a shutter around the substrate may be detached. Further, a spacer may be attached between a transport tray and the substrate, or an aluminum plate may be attached between the substrate and the substrate holder. In this case, the sputter gun for metal is moved as necessary to change the distance between the sputter gun for metal and the substrate as well.

The specific resistance (ρ) of the nanogranular magnetic film may be measured by any method. For example, a resistivity meter can be used for measurement. The magnetic properties of the nanogranular magnetic film may be measured by any method. For example, a vibrating sample magnetometer (VSM) can be used for measurement.

Hereinabove, one embodiment of the present invention has been explained, but the present invention is not to be limited to the embodiment.

The nanogranular magnetic film according to the present embodiment may be used for any purpose. A magnetic material including the nanogranular magnetic film is suitable for electronic components that are particularly used at a high frequency and are required to have a high specific resistance (ρ). Examples of the electronic components include a perpendicular recording medium, a TMR head for a magnetoresistive random access memory (MRAM), a magneto-optical element, a thin film inductor, a noise filter, and a high-frequency capacitor.

The magnetic material including the nanogranular magnetic film in the above-mentioned electronic components may have a single-layer structure including only the nanogranular magnetic film, or may have a multilayer structure including the nanogranular magnetic film and other films (e.g., $SiO_2$ films) containing other materials. The number of layers is not limited to particular numbers.

EXAMPLES

Hereinafter, the present invention will be specifically explained with examples.

Experiment 1

Two silicon substrates (6×6×0.6 mmt) each having a thermal oxide film were prepared as sample substrates for measurement with a VSM. One silicon substrate (6×6×0.6 mmt) having a thermal oxide film with a resist (length: 6 mm, width: 0.5 to 1 mm) thereon was prepared as a dummy substrate for film thickness measurement. One sapphire substrate (φ2 inches, 0.4 mmt) was prepared as a dummy substrate for composition check and sheet resistance measurement. On each of these substrates, a nanogranular magnetic film was formed simultaneously. A multi-target simultaneous sputtering apparatus (ES340 manufactured by EIKO Corporation) was used for film formation. Further details will be explained below.

In Experiment 1, a metal sputtering target made of an alloy having an atomic ratio of $Fe_{60}Co_{40}$ and a ceramic sputtering target made of $SiO_2$ were prepared as sputtering targets. Next, the sputtering targets were attached to different sputter guns.

In Experiment 1, the gas pressure of Ar during sputtering was fixed to 0.4 Pa. The distance (TS distance) between the ceramic sputtering target and the sample substrates was set to a value shown in Table 1 to control the porosity of the nanogranular magnetic film. The distance between the metal sputtering target and the sample substrates was 90 mm.

Sputtering was performed with controlled power input to each sputtering target so that the ratio of the volume of first phases to the total volume of the first phases and a second phase was about 55% and the film deposition speed was 1.0 Å/s, to form the nanogranular magnetic film. The nanogranular magnetic film had a thickness of 300 nm.

The nanogranular magnetic film formed on the sapphire substrate was measured with an XRF spectrometer (Primus IV manufactured by Rigaku Corporation) to calculate the ratio of the volume of the first phases to the total volume of the first phases and the second phase. Table 1 shows the results.

Using a TEM (JEM-2100F manufactured by JEOL Ltd.), it was confirmed that the nanogranular magnetic film formed on one silicon substrate having the thermal oxide film of each sample had a structure including the first phases 11 (nano-domains) dispersed in the second phase 12. Using the TEM, it was further confirmed that the first phases (nano-domains) had an average size of 30 nm or less. Using TEM-EDS, it was also confirmed that the ratio of the total amount of Fe, Co, and Ni in the first phases to the total amount of Fe, Co, Ni, X1, and X2 in the first phases was 75 at % or more.

The porosity of the nanogranular magnetic film of each sample was measured by the above-mentioned method. XRF was used to measure the percentages of all substances in the nanogranular magnetic film, which were necessary for calculating the converted thickness. The percentages measured using the thin film formed on the sapphire substrate were regarded as the percentages of the nanogranular magnetic film of each sample. Primus IV manufactured by Rigaku Corporation was used as an XRF spectrometer. In XRF, a thin film FP method was used with a measurement diameter of φ30 mm.

The actual thickness of the nanogranular magnetic film was measured with a surface profiler (KLA-Tencor P-16+), which had been correlated with the TEM in advance. Specifically, the actual thickness of the thin film formed on the dummy substrate for film thickness measurement was measured with the surface profiler. The measured film thickness was regarded as the actual film thickness of each sample. Table 1 shows the results.

The coercivity (Hc) of the nanogranular magnetic film formed on the other silicon substrate having the thermal oxide film of each sample was measured with a VSM. The magnetic properties were measured with the VSM (TM-VSM331483-HGC) manufactured by TAMAKAWA CO., LTD. at a magnetic field of −10,000 Oe to +10,000 Oe. Table 1 shows the results. The coercivity (Hc) was regarded as good at 4.00 Oe or less and better at 3.00 Oe or less.

To calculate the specific resistance (ρ) of each sample, the sheet resistance was measured with a resistivity meter (Loresta-EP MCP-T360 manufactured by Mitsubishi Chemical Corporation). The sheet resistance of the thin film formed on the sapphire substrate for composition check and sheet resistance measurement was measured. The measured sheet resistance was regarded as the sheet resistance of the thin film in each experiment. Using the actual thickness of the thin film formed on the dummy substrate for film thickness measurement, the specific resistance (ρ) of each sample was calculated.

The specific resistance (ρ) was regarded as good when the ratio (may be referred to as "ρ ratio") of a ρ value to the ρ value of a sample having a TS distance of 90 mm was 1.20 or more. Table 1 shows the results.

TABLE 1

| | $V_1/(V_1 + V_2)$ | TS distance (mm) | Porosity | ρ (Ω · cm) | ρ ratio | Hc (Oe) |
|---|---|---|---|---|---|---|
| Comparative Example 1 | 0.55 | 55 | 0.07 | 0.060 | 0.90 | 1.97 |
| Comparative Example 2 | 0.55 | 75 | 0.11 | 0.063 | 0.94 | 1.88 |
| Comparative Example 3 | 0.55 | 90 | 0.15 | 0.067 | 1.00 | 1.84 |
| Comparative Example 4 | 0.55 | 95 | 0.15 | 0.070 | 1.04 | 1.85 |
| Example 1 | 0.55 | 105 | 0.17 | 0.087 | 1.30 | 1.90 |
| Example 2 | 0.55 | 140 | 0.19 | 0.110 | 1.64 | 1.96 |
| Example 3 | 0.55 | 200 | 0.23 | 0.304 | 4.53 | 2.60 |

According to Table 1, it was confirmed that, the longer the TS distance, namely the longer the distance between the ceramic sputtering target and the sample substrates, the larger the porosity. It was also confirmed that Examples 1 to 3 with a porosity of 0.17 or more and 0.30 or less had higher p values than the Comparative Examples under substantially the same conditions except for the porosity.

Experiment 2

Experiment 2 was carried out as in Experiment 1, except that the ratio of the volume of the first phases to the total volume of the first phases and the second phase was about 47%. Table 2 shows the results. For the Example and the Comparative Example having a TS distance of 240 mm or more, the loading positions of the substrates were changed, and the distance between the metal sputtering target and the sample substrates was accordingly adjusted to 90 mm.

TABLE 2

| | $V_1/(V_1 + V_2)$ | TS distance (mm) | Porosity | ρ (Ω · cm) | ρ ratio | Hc (Oe) |
|---|---|---|---|---|---|---|
| Comparative Example 5 | 0.47 | 55 | 0.07 | 1.03 | 0.94 | 0.25 |
| Comparative Example 6 | 0.47 | 75 | 0.09 | 1.05 | 0.95 | 0.22 |
| Comparative Example 7 | 0.47 | 90 | 0.15 | 1.10 | 1.00 | 0.21 |
| Example 4 | 0.47 | 105 | 0.18 | 1.41 | 1.28 | 0.20 |
| Example 5 | 0.47 | 140 | 0.20 | 1.88 | 1.71 | 0.22 |
| Example 6 | 0.47 | 150 | 0.21 | 2.46 | 2.24 | 0.27 |
| Example 7 | 0.47 | 200 | 0.24 | 3.66 | 3.33 | 0.42 |
| Example 8 | 0.47 | 240 | 0.30 | 8.10 | 7.36 | 0.99 |
| Comparative Example 8 | 0.47 | 270 | 0.37 | 25.5 | 23.18 | 4.12 |

According to Table 2, it was confirmed that, the longer the TS distance, namely the longer the distance between the ceramic sputtering target and the sample substrates, the larger the porosity. It was also confirmed that Examples 4 to 8 with a porosity of 0.17 or more and 0.30 or less had higher p values than the Comparative Examples under substantially the same conditions except that the porosity was too low. It was further confirmed that Examples 4 to 8 with a porosity of 0.17 or more and 0.30 or less had lower Hc values than the Comparative Example under substantially the same conditions except that the porosity was too high.

Experiment 3

Experiment 3 was carried out as in Experiment 1, except that the composition of the metal sputtering target was changed to change the composition of the first phases as shown in Tables 3A and 3B. Tables 3A and 3B show the results. Note that, in Experiments 3, 5, and 6, the Hc values of all Examples were 3.00 Oe or less. Note that, when Si was intentionally not included in the metal sputtering target, it may be that the first phases included a small amount of Si attributable to the ceramic sputtering target. However, such a small amount of Si was not taken into account in Tables 3A and 3B.

TABLE 3A

| | First phase composition (at %) | | | | | | | | | | | | | |
|---|---|---|---|---|---|---|---|---|---|---|---|---|---|---|
| | | | | X1 | | X1 | | X2 | | $V_1/$ | TS distance | | ρ | |
| | Fe | Co | Ni | Element | Percentage | Element | Percentage | Element | Percentage | $(V_1 + V_2)$ | (mm) | Porosity | (Ω · cm) | ρ ratio |
| Comparative Example 3 | 60 | 40 | — | — | — | — | — | — | — | 0.55 | 90 | 0.15 | 0.067 | 1.00 |
| Example 2 | 60 | 40 | — | — | — | — | — | — | — | 0.55 | 140 | 0.19 | 0.110 | 1.64 |
| Comparative Example 9 | 20 | 80 | — | — | — | — | — | — | — | 0.55 | 90 | 0.15 | 0.072 | 1.00 |
| Example 9 | 20 | 80 | — | — | — | — | — | — | — | 0.55 | 140 | 0.20 | 0.127 | 1.76 |
| Comparative Example 10 | 80 | 20 | — | — | — | — | — | — | — | 0.55 | 90 | 0.16 | 0.060 | 1.00 |
| Example 10 | 80 | 20 | — | — | — | — | — | — | — | 0.55 | 140 | 0.20 | 0.103 | 1.72 |
| Comparative Example 11 | 100 | — | — | — | — | — | — | — | — | 0.55 | 90 | 0.16 | 0.056 | 1.00 |
| Example 11 | 100 | — | — | — | — | — | — | — | — | 0.55 | 140 | 0.19 | 0.097 | 1.73 |
| Comparative Example 12 | — | 100 | — | — | — | — | — | — | — | 0.55 | 90 | 0.14 | 0.062 | 1.00 |
| Example 12 | — | 100 | — | — | — | — | — | — | — | 0.55 | 140 | 0.18 | 0.106 | 1.71 |
| Comparative Example 13 | 55 | — | 45 | — | — | — | — | — | — | 0.55 | 90 | 0.13 | 0.077 | 1.00 |
| Example 13 | 55 | — | 45 | — | — | — | — | — | — | 0.55 | 140 | 0.18 | 0.128 | 1.66 |
| Comparative Example 14 | 75 | — | — | B | 25 | — | — | — | — | 0.55 | 90 | 0.14 | 0.088 | 1.00 |
| Example 14 | 75 | — | — | B | 25 | — | — | — | — | 0.55 | 140 | 0.19 | 0.153 | 1.74 |
| Comparative Example 15 | 85 | — | — | P | 15 | — | — | — | — | 0.55 | 90 | 0.14 | 0.080 | 1.00 |
| Example 15 | 85 | — | — | P | 15 | — | — | — | — | 0.55 | 140 | 0.18 | 0.137 | 1.71 |
| Comparative Example 16 | 85 | — | — | C | 15 | — | — | — | — | 0.55 | 90 | 0.15 | 0.076 | 1.00 |
| Example 16 | 85 | — | — | C | 15 | — | — | — | — | 0.55 | 140 | 0.19 | 0.133 | 1.75 |
| Comparative Example 17 | 80 | — | — | B | 10 | Si | 10 | — | — | 0.55 | 90 | 0.14 | 0.097 | 1.00 |
| Example 17 | 80 | — | — | B | 10 | Si | 10 | — | — | 0.55 | 140 | 0.19 | 0.162 | 1.67 |
| Comparative Example 18 | 98 | — | — | — | — | Ge | 2 | — | — | 0.55 | 90 | 0.16 | 0.057 | 1.00 |
| Example 18 | 98 | — | — | — | — | Ge | 2 | — | — | 0.55 | 140 | 0.18 | 0.098 | 1.72 |

TABLE 3B

| | First phase composition (at %) | | | | | | | | | $V_1/$ | TS distance | | ρ | |
|---|---|---|---|---|---|---|---|---|---|---|---|---|---|---|
| | | | | X1 | | X1 | | X2 | | | | | | |
| | Fe | Co | Ni | Element | Percentage | Element | Percentage | Element | Percentage | $(V_1 + V_2)$ | (mm) | Porosity | (Ω · cm) | ρ ratio |
| Comparative Example 19 | 98 | — | — | — | — | — | — | Cr | 2 | 0.55 | 90 | 0.16 | 0.062 | 1.00 |
| Example 19 | 98 | — | — | — | — | — | — | Cr | 2 | 0.55 | 140 | 0.19 | 0.100 | 1.61 |
| Comparative Example 20 | 98 | — | — | — | — | — | — | V | 2 | 0.55 | 90 | 0.15 | 0.058 | 1.00 |
| Example 20 | 98 | — | — | — | — | — | — | V | 2 | 0.55 | 140 | 0.19 | 0.097 | 1.67 |
| Comparative Example 21 | 98 | — | — | — | — | — | — | Mo | 2 | 0.55 | 90 | 0.16 | 0.059 | 1.00 |
| Example 21 | 98 | — | — | — | — | — | — | Mo | 2 | 0.55 | 140 | 0.19 | 0.099 | 1.68 |
| Comparative Example 22 | 98 | — | — | — | — | — | — | Zr | 2 | 0.55 | 90 | 0.16 | 0.060 | 1.00 |
| Example 22 | 98 | — | — | — | — | — | — | Zr | 2 | 0.55 | 140 | 0.19 | 0.100 | 1.67 |
| Comparative Example 23 | 98 | — | — | — | — | — | — | Nb | 2 | 0.55 | 90 | 0.15 | 0.059 | 1.00 |
| Example 23 | 98 | — | — | — | — | — | — | Nb | 2 | 0.55 | 140 | 0.18 | 0.098 | 1.66 |
| Comparative Example 24 | 98 | — | — | — | — | — | — | Ti | 2 | 0.55 | 90 | 0.16 | 0.058 | 1.00 |
| Example 24 | 98 | — | — | — | — | — | — | Ti | 2 | 0.55 | 140 | 0.19 | 0.097 | 1.67 |
| Comparative Example 25 | 98 | — | — | — | — | — | — | Mn | 2 | 0.55 | 90 | 0.15 | 0.056 | 1.00 |
| Example 25 | 98 | — | — | — | — | — | — | Mn | 2 | 0.55 | 140 | 0.19 | 0.096 | 1.71 |
| Comparative Example 26 | 98 | — | — | — | — | — | — | Zn | 2 | 0.55 | 90 | 0.16 | 0.055 | 1.00 |
| Example 26 | 98 | — | — | — | — | — | — | Zn | 2 | 0.55 | 140 | 0.19 | 0.093 | 1.69 |
| Comparative Example 27 | 98 | — | — | — | — | — | — | Al | 2 | 0.55 | 90 | 0.15 | 0.054 | 1.00 |
| Example 27 | 98 | — | — | — | — | — | — | Al | 2 | 0.55 | 140 | 0.19 | 0.091 | 1.69 |
| Comparative Example 28 | 98 | — | — | — | — | — | — | Cu | 2 | 0.55 | 90 | 0.16 | 0.052 | 1.00 |
| Example 28 | 98 | — | — | — | — | — | — | Cu | 2 | 0.55 | 140 | 0.18 | 0.088 | 1.69 |
| Comparative Example 29 | 98 | — | — | — | — | — | — | Y | 2 | 0.55 | 90 | 0.16 | 0.059 | 1.00 |
| Example 29 | 98 | — | — | — | — | — | — | Y | 2 | 0.55 | 140 | 0.18 | 0.099 | 1.68 |

According to Tables 3A and 3B, it was confirmed that, even when the composition of the metal sputtering target was changed, Examples 2 and 9 to 29 with a porosity of 0.17 or more and 0.30 or less had higher ρ values than the Comparative Examples under substantially the same conditions except for the porosity.

Experiment 4

Experiment 4 was carried out as in Example 2 and Comparative Example 3 of Experiment 1, except that the ratio of the volume of the first phases to the total volume of the first phases and the second phase was changed. Table 4 shows the results.

TABLE 4

| | $V_1/(V_1 + V_2)$ | TS distance (mm) | Porosity | ρ (Ω · cm) | ρ ratio | Hc (Oe) |
|---|---|---|---|---|---|---|
| Comparative Example 30 | 0.34 | 90 | 0.16 | 30.8 | 1.00 | 0.14 |
| Example 30 | 0.34 | 140 | 0.21 | 62.2 | 2.02 | 0.12 |
| Comparative Example 31 | 0.38 | 90 | 0.16 | 10.4 | 1.00 | 0.18 |
| Example 31 | 0.38 | 140 | 0.20 | 19.5 | 1.88 | 0.14 |
| Comparative Example 7 | 0.47 | 90 | 0.15 | 1.10 | 1.00 | 0.21 |
| Example 5 | 0.47 | 140 | 0.20 | 1.88 | 1.71 | 0.22 |
| Comparative Example 3 | 0.55 | 90 | 0.15 | 0.067 | 1.00 | 1.84 |
| Example 2 | 0.55 | 140 | 0.19 | 0.110 | 1.64 | 1.96 |
| Comparative Example 32 | 0.65 | 90 | 0.14 | 0.0071 | 1.00 | 2.77 |
| Example 32 | 0.65 | 140 | 0.19 | 0.0090 | 1.27 | 2.95 |
| Comparative Example 33 | 0.75 | 90 | 0.14 | 0.000094 | 1.00 | 19.52 |
| Comparative Example 34 | 0.75 | 140 | 0.18 | 0.000099 | 1.05 | 22.09 |

According to Table 4, when the ratio of the volume of the first phases to the total volume of the first phases and the second phase was 65% or less, the porosity was 0.17 or more and 0.30 or less, and the ρ value was higher than the Comparative Examples under substantially the same conditions except for the porosity.

When the ratio of the volume of the first phases to the total volume of the first phases and the second phase was 75%, the ρ value was significantly lower and the Hc value was significantly higher than when the ratio was 65% or less. Even at a porosity of 0.17 or more, the ρ value was not sufficiently higher than that of the Comparative Example under substantially the same conditions except for the porosity.

Experiment 5

Experiment 5 was carried out as in Example 2 and Comparative Example 3 of Experiment 1, except that the compound included in the second phase was changed. To change the compound included in the second phase, the ceramic sputtering target was changed. Table 5 shows the results.

TABLE 5

| | Ceramic sputtering target | $V_1/(V_1 + V_2)$ | TS distance (mm) | Porosity | ρ (Ω · cm) | ρ ratio |
|---|---|---|---|---|---|---|
| Comparative Example 35 | $Al_2O_3$ | 0.56 | 90 | 0.14 | 0.072 | 1.00 |
| Example 33 | $Al_2O_3$ | 0.56 | 140 | 0.19 | 0.131 | 1.82 |
| Comparative Example 36 | AlN | 0.53 | 90 | 0.15 | 0.065 | 1.00 |
| Example 34 | AlN | 0.53 | 140 | 0.20 | 0.102 | 1.57 |
| Comparative Example 3 | $SiO_2$ | 0.55 | 90 | 0.15 | 0.067 | 1.00 |
| Example 2 | $SiO_2$ | 0.55 | 140 | 0.19 | 0.110 | 1.64 |
| Comparative Example 37 | ZnO | 0.55 | 90 | 0.16 | 0.058 | 1.00 |
| Example 35 | ZnO | 0.55 | 140 | 0.20 | 0.094 | 1.62 |
| Comparative Example 38 | $MgF_2$ | 0.54 | 90 | 0.16 | 0.034 | 1.00 |
| Example 36 | $MgF_2$ | 0.54 | 140 | 0.19 | 0.049 | 1.44 |
| Comparative Example 39 | $SnO_2$ | 0.55 | 90 | 0.15 | 0.077 | 1.00 |
| Example 37 | $SnO_2$ | 0.55 | 140 | 0.19 | 0.124 | 1.61 |
| Comparative Example 40 | $GaO_2$ | 0.56 | 90 | 0.14 | 0.061 | 1.00 |
| Example 38 | $GaO_2$ | 0.56 | 140 | 0.18 | 0.097 | 1.59 |
| Comparative Example 41 | $GeO_2$ | 0.55 | 90 | 0.15 | 0.064 | 1.00 |
| Example 39 | $GeO_2$ | 0.55 | 140 | 0.19 | 0.101 | 1.58 |
| Comparative Example 42 | $Si_3N_4$•$Al_2O_3$ | 0.55 | 90 | 0.15 | 0.064 | 1.00 |
| Example 40 | $Si_3N_4$•$Al_2O_3$ | 0.55 | 140 | 0.19 | 0.101 | 1.58 |

According to Table 5, it was confirmed that, even when the compound included in the second phase was changed, provided that the porosity was 0.17 or more and 0.30 or less, the ρ value was higher than that of the Comparative Examples under substantially the same conditions except for the porosity.

Experiment 6

Experiment 6 was carried out as in Comparative Example 3 of Experiment 1, except that the distance ("TS2 distance") between the metal sputtering target and the sample substrates was changed. Table 6 shows the results. Note that the ρ ratio denoted the ratio of a ρ value to the ρ value of Comparative Example 3.

TABLE 6

| | $V_1/(V_1+V_2)$ | TS distance (mm) | TS2 distance (mm) | Porosity | ρ (Ω · cm) | ρ ratio |
|---|---|---|---|---|---|---|
| Comparative Example 3 | 0.55 | 90 | 90 | 0.15 | 0.067 | 1.00 |
| Example 41 | 0.55 | 140 | 55 | 0.18 | 0.102 | 1.52 |
| Example 2 | 0.55 | 140 | 90 | 0.19 | 0.110 | 1.64 |
| Example 42 | 0.55 | 140 | 140 | 0.21 | 0.109 | 1.63 |

According to Table 6, it was confirmed that changing the TS2 distance did not significantly change the porosity or the ρ value.

Experiment 7

The substrate temperature during sputtering was increased to change the average particle size of the first phases 11 of the nanogranular magnetic film, namely the average size of the first phases (nano-domains). Samples were manufactured as in Example 2 except that the substrate temperature was different, and were compared. Table 7 shows the results.

TABLE 7

| | $V_1/(V_1+V_2)$ | TS distance (mm) | Substrate temperature (° C.) | Average size (nm) | Porosity | ρ (Ω · cm) | Hc (Oe) |
|---|---|---|---|---|---|---|---|
| Example 2 | 0.55 | 140 | R.T. | 4 | 0.19 | 0.110 | 1.89 |
| Example 43 | 0.55 | 140 | 200 | 12 | 0.18 | 0.106 | 2.08 |
| Example 44 | 0.55 | 140 | 300 | 30 | 0.18 | 0.101 | 2.55 |
| Example 45 | 0.55 | 140 | 350 | 50 | 0.17 | 0.079 | 3.87 |

R.T. = Room Temperature (25° C.)

According to Table 7, as the average particle size of the first phases 11 increased, namely as the average size of the first phases (nano-domains) increased, the porosity gradually decreased. Along with the decrease of porosity, the coercivity increased. In Example 45 with an average particle size, namely an average size of the first phases (nano-domains) of over 30 nm, the porosity decreased to 0.17 and the coercivity (Hc) increased to a value rather higher than that of other Examples.

NUMERICAL REFERENCES

1 . . . nanogranular magnetic film
11 . . . first phase
12 . . . second phase

What is claimed is:

1. A nanogranular magnetic film comprising a structure including first phases comprised of nano-domains dispersed in a second phase, wherein the first phases include at least one selected from the group consisting of Fe, Co, and Ni;

the second phase is formed from a compound selected from the group consisting of: $SiO_2$, $Al_2O_3$, AlN, ZnO, $MgF_2$, $SnO_2$, $GaO_2$, $GeO_2$, $Si_3N_4{\cdot}Al_2O_3$, and any combination thereof;

a ratio of a volume of the first phases to a total volume of the first phases and the second phase is 65% or less; and the nanogranular magnetic film has a porosity of 0.17 or more and 0.30 or less.

2. The nanogranular magnetic film according to claim 1, wherein the first phases comprised of the nano-domains have an average size of 30 nm or less.

3. The nanogranular magnetic film according to claim 1, wherein a total of Fe, Co, and Ni occupies 75 at % or more in the first phases.

4. An electronic component comprising the nanogranular magnetic film according to claim 1.

5. The nanogranular magnetic film according to claim 1, wherein the nanogranular magnetic film is formed on a substrate.

* * * * *